(12) United States Patent
Saito et al.

(10) Patent No.: US 7,352,921 B2
(45) Date of Patent: Apr. 1, 2008

(54) MULTILAYER OPTICAL FIBER SHEET, OPTICAL FIBER SHEET FABRICATING METHOD, AND OPTICAL FIBER SHEET

(75) Inventors: Daigo Saito, Sakura (JP); Kazuhiro Takizawa, Sakura (JP); Tsuyoshi Simomichi, Sakura (JP); Yasuhiro Tamaki, Sakura (JP); Yukio Hayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 281 days.

(21) Appl. No.: 10/473,885

(22) PCT Filed: Apr. 5, 2002

(86) PCT No.: PCT/JP02/03448

§ 371 (c)(1),
(2), (4) Date: Apr. 29, 2004

(87) PCT Pub. No.: WO02/082132

PCT Pub. Date: Oct. 17, 2002

(65) Prior Publication Data

US 2004/0213505 A1 Oct. 28, 2004

(30) Foreign Application Priority Data

| Apr. 5, 2001 | (JP) | ............................. 2001-107689 |
| Jan. 28, 2002 | (JP) | ............................. 2002-019116 |
| Jan. 28, 2002 | (JP) | ............................. 2002-019117 |

(51) Int. Cl.
*G02B 6/12* (2006.01)

(52) U.S. Cl. .................. 385/14; 385/114; 385/131
(58) Field of Classification Search ................ 385/14, 385/18–24, 27, 30, 114–116, 120, 121, 129–132
See application file for complete search history.

(56) References Cited

U.S. PATENT DOCUMENTS

| 6,185,348 B1 * | 2/2001 | Shahid ........................ 385/49 |
| 6,324,325 B1 * | 11/2001 | Booth et al. ................. 385/114 |
| 2001/0055443 A1 * | 12/2001 | Zhao et al. ................... 385/30 |

FOREIGN PATENT DOCUMENTS

| JP | 7-128563 A | 5/1995 |
| JP | 8-86920 A | 4/1996 |
| JP | 2574611 B2 | 10/1996 |
| JP | 11-202149 A | 7/1999 |
| JP | 3130265 B2 | 11/2000 |

* cited by examiner

*Primary Examiner*—Kevin S. Wood
(74) *Attorney, Agent, or Firm*—Sughrue Mion, PLLC

(57) ABSTRACT

In order to avoid a frequent multiple crossing in an optical fiber in a sheet and attach the optical connector near a marginal end of the sheet while maintaining a sufficient extra length and more extra length for attaching the optical fibers, in the optical fiber sheet 6, an optical fiber 5 as an extra length section in the optical fiber path is disposed on three-layer wiring planes which are formed by attaching four sheets 1, 2, 3, and 4. Notched sections 2a and 3a are formed in the intermediate layers 2 and 3. The optical fiber 5 communicates from a first wiring layer to a second wiring layer via the notched section 2a so as to communicate from the second wiring layer to a third wiring layer via the notched section 3a.

4 Claims, 8 Drawing Sheets

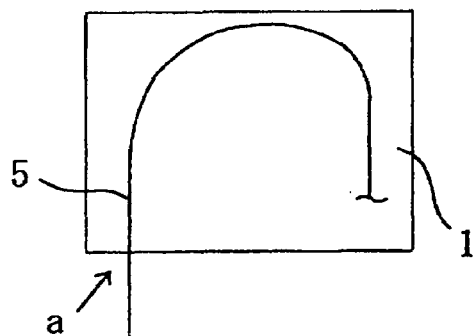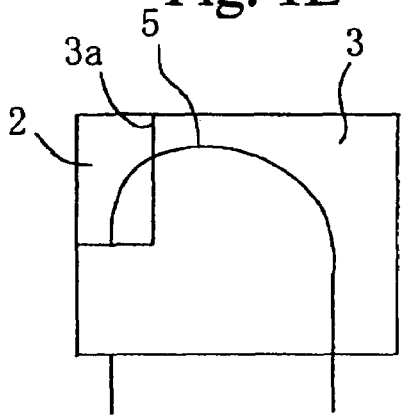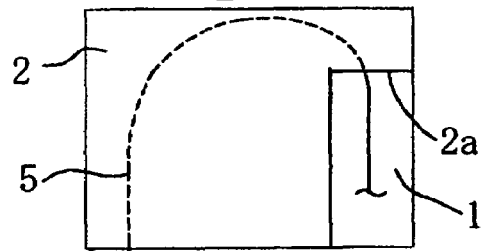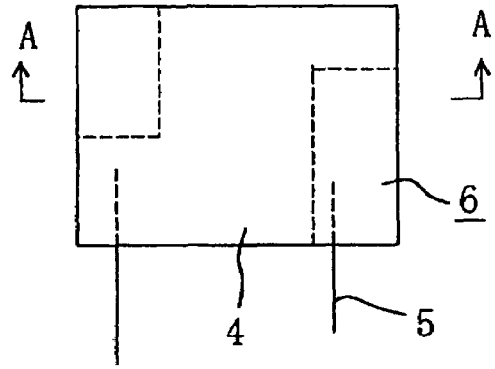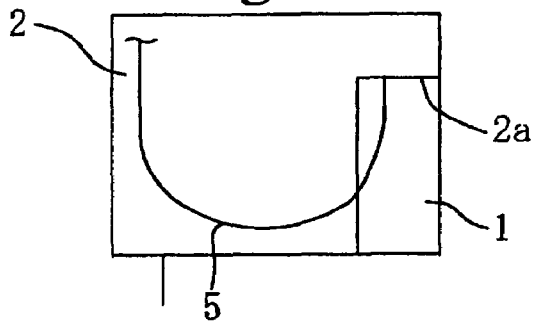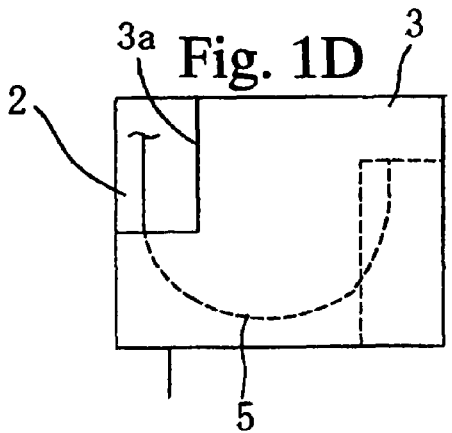

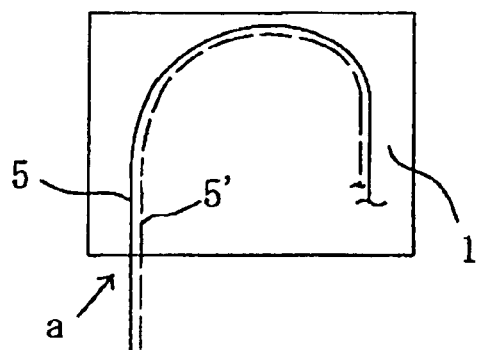
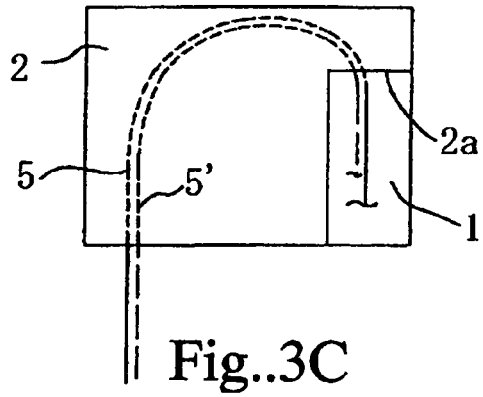
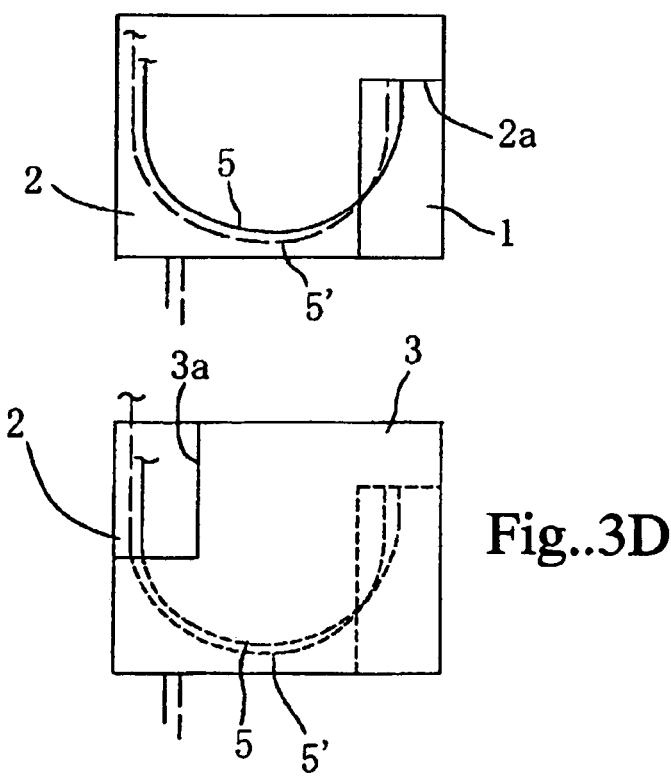
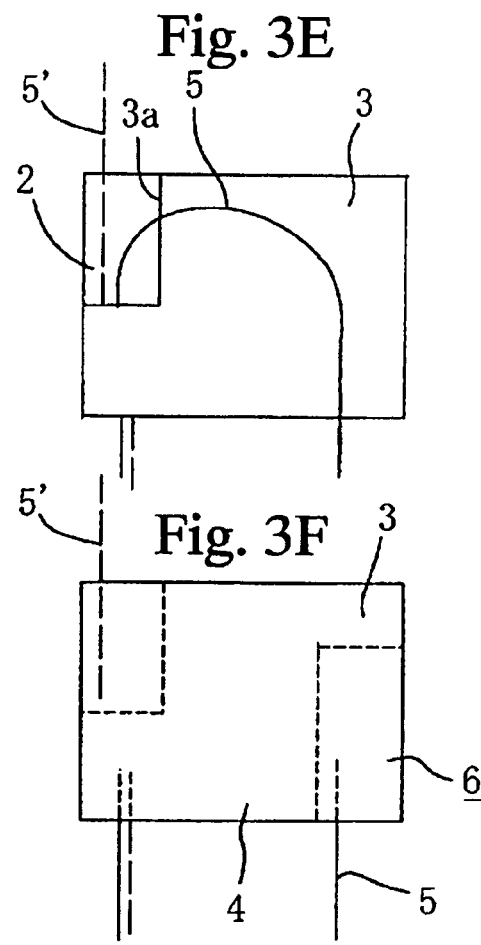
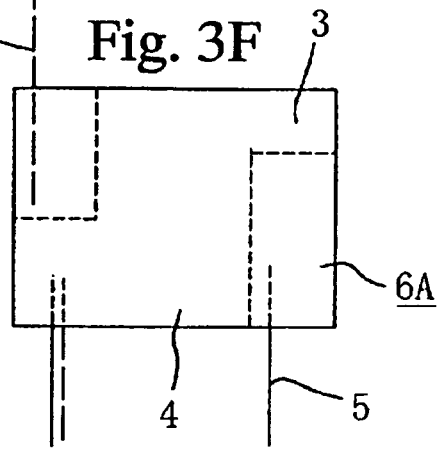

MULTILAYER OPTICAL FIBER SHEET, OPTICAL FIBER SHEET FABRICATING METHOD, AND OPTICAL FIBER SHEET

TECHNICAL FIELD

The present invention relates to a multi-layer optical fiber sheet in which optical fibers can be disposed densely. Also, the present invention relates to a method for manufacturing an optical fiber sheet in which optical fibers are disposed on a flexible sheet, and to an optical fiber sheet.

BACKGROUND ART

In a conventional optical fiber sheet, optical fibers are disposed between two flexible resin sheets having the same size as each other which are attached together. Such a conventional optical fiber sheet is usually manufactured by disposing optical fibers on surfaces of sheets on which a pressure sensitive bonding agent (adhesive agent) is applied, and attaching a sheet on which a pressure sensitive bonding agent is applied thereto. Optical fiber sheet is used mainly for a wiring section in an optical fiber in an optical apparatus.

For example, in case in which an extra length part of the optical fiber path is disposed for an optical fiber sheet, it is limited to bend the optical fiber. If such an extra length pat to be used for a wiring section is too long, the optical fiber wiring section is too dense (crowded); thus, there occur direct crosses between the optical fibers in the sheet too often. Therefore, such a direct cross region becomes a bulge; thus, there is a disadvantage in that it is difficult to fix the disposed optical fiber. That is, if so many optical fibers crosses each other, close contact (adhesion) in both sheets which are disposed vertically tend to be reduced; thus, it may occur that the disposed optical fibers move undesirably. When the optical fiber is not fixed in a desirable position in the sheet reliably, the optical fibers cannot be disposed in the sheet accurately so as to be assembled in a device due to its successive usage for a long period. In some cases, there is a concern that the optical fiber may be damaged.

Also, a multiple crossings may occur easily in which a plurality of optical fibers crosses each other collectively. In such a multiple crossing region, there is a concern that an unacceptable bending may occur on the optical fibers. Furthermore, there is a case in which a sheet area must be enlarged so as to prevent the multiple crossings.

Also, in the above conventional optical fiber sheet, when an optical connector is attached to the optical fiber which expands from the sheet near an marginal end of the optical sheet, it is not possible to attach the optical connector if the optical fiber which is expanded from the marginal end of the sheet is too short. Therefore, predetermined extra length of the optical fiber is necessary so as to attach the optical connector near the marginal end of the sheet. Also, for a case in which the optical connector is failed to be attached, it is necessary to prepare a greater extra length of the optical fiber so as to cut the optical fiber to attach the optical fiber again. Therefore, it is necessary to prepare a predetermined length of optical fiber from a marginal end of the sheet to a rear end of the optical connector. Thus, there is a disadvantage in that it is difficult, or impossible, to manufacture an optical fiber sheet if the optical fiber has a short extra length, or if the optical fiber has no extra length.

Also, in an optical fiber sheet, a plurality of optical fibers are usually disposed. That is, only an optical fiber is not disposed in an optical fiber sheet. When optical connectors are attached to a plurality of optical fibers respectively near the marginal end of the sheet such that a distance from the marginal end of the sheet should be constant, it is necessary to adjust the length of the extra portion of the optical fiber so as to realize a low skew (that is, to reduce non-uniform distances from the marginal end of the sheet). In the above conventional structure, it is necessary to prepare an area in the optical fiber sheet for disposing an extra length of the optical fiber so as to adjust the extra length of the optical fiber in addition to a necessary area for disposing an optical fiber. Therefore, size of the optical fiber sheet may becomes undesirably large.

Here, in case in which a lot of optical fibers are disposed such that the extra length of optical fiber is disposed in the same area as the necessary wiring area, the wiring condition of the optical fibers become more complicated; thus, a multiple crossing in which more than three optical fibers cross each other collectively may occur easily. Furthermore, the optical fibers may be bent in an area in which the optical fibers are crossing each other. If two optical fibers are crossing, the bending of the optical fibers may be acceptable. However, if more than three optical fibers are crossing, the bending of the optical fibers may not be in an acceptable range. Furthermore, there is a bulge of the optical fibers in such a crossing area; thus, there is a concern that the adhesion of the sheet may be insufficient.

In order to solve the above problems, it is necessary to form an area for disposing an extra length of the optical fiber in addition to a necessary area for disposing the optical fiber by enlarging the sheet area.

Such an area for disposing an extra length of the optical fiber is not limited in a case for attaching the optical connector. That is, such an area for disposing an extra length of the optical fiber is necessary in various cases in which extra length of the optical fiber is needed.

DISCLOSURE OF INVENTION

The present invention was made in consideration of the above conventional problems. A first object of the present invention is to provide a multi-layer optical fiber sheet in which crossing of the optical fibers is eliminated or reduced as minimum as possible in a wiring plane, the optical fibers are fixed reliably, and an unacceptable bending of the optical fibers due to the multiple crossing of the optical fibers can be prevented while disposing the optical fibers densely in a limited area in the sheet.

A second object of the present invention is to provide a method for manufacturing an optical fiber sheet in which it is possible to attach the optical connector while preparing a sufficient extra length of the optical fiber and more extra length of the optical fiber, and it is possible to dispose an extra length of optical fiber in various cases in which an extra length of optical fiber is necessary without disposing an unnecessary area for disposing an extra length of optical fiber in a limited area in the sheet.

In order to solve the above problems, in a multi-layer optical fiber sheet according to the present invention having multi-layered optical fiber over a plurality of wiring layers which is formed by attaching more than three sheets, an interlayer communicating section is formed in at least an intermediate sheet among the sheets, and the optical fibers which are disposed in the sheets communicates a region between the wiring layers via the interlayer communicating section.

In the above multi-layer optical fiber sheet, it may be preferable that the interlayer communicating section in the sheets which overlap vertically each other do not overlap precisely each other.

In the above multi-layer optical fiber sheet, it may be preferable that a plurality of the optical fibers are disposed such that each optical fiber is drawn out of the sheets from different region in the sheets.

In the above multi-layer optical fiber sheet, it may be preferable that the intermediate sheet is mainly made of a pressure sensitive bonding agent.

In the above multi-layer optical fiber sheet, it may be preferable that an intermediate layer for fixing optical fibers is disposed between optical fiber sheets which are layered vertically, the optical fibers are disposed on different wiring planes in the intermediate layer, and optical fiber paths for communicating the different wiring planes are formed in a region between the optical fiber sheets which are layered vertically.

In the above multi-layer optical fiber sheet, it may be preferable that the intermediate layer is a pressure sensitive bonding agent layer.

A method for manufacturing an optical fiber sheet according to the present invention comprises the steps for disposing optical fibers on a first sheet by a desirable pattern, applying a second sheet on the first sheet so as to have an interlayer communicating section therebetween, attaching an optical connector on a tip of an optical fiber which is drawn out of the sheets, disposing the optical fiber to which the optical connector is attached on the second sheet via the interlayer communicating section, and applying a third sheet on the second sheet.

The above method for manufacturing an optical fiber sheet further comprises the steps for disposing an optical fiber tentatively on the second sheet such that a predetermined length of the optical fiber should be drawn out of an end margin of the sheet, removing the optical fiber which is tentatively disposed on the second sheet, attaching an optical connector on a tip of the removed optical fiber, disposing the optical fiber on the second sheet again, and applying the third sheet to the second sheet.

In the above method for manufacturing an optical fiber sheet, it may be preferable that the optical fiber is drawn out to the interlayer communicating section.

The above method for manufacturing an optical fiber sheet comprises the steps for disposing optical fibers on a first sheet by a desirable pattern, applying a second sheet, which is provided with a notched section in a region to which the optical fiber is drawn, on the first sheet, disposing an optical fiber tentatively which expands from the notched section on the second sheet such that a predetermined length of the optical fiber should be drawn out of an end margin of the sheet, removing the optical fiber which is tentatively disposed on the second sheet, disposing the optical fiber on the second sheet again so as to have a predetermined extra length of optical fiber after disposing the optical fiber, and applying the third sheet to the second sheet.

In the above method for manufacturing an optical fiber sheet, it may be preferable that an intermediate layer for fixing an optical fiber is formed between sheets which are layered vertically, the optical fiber has different wiring plane in the intermediate layer, optical fiber paths which communicates the wiring planes a formed inside the sheets, and the optical fiber is disposed on the different wiring plane so as be drawn out of the sheets to be connected to the connector.

In the above method for manufacturing an optical fiber sheet, it may be preferable that the intermediate layer is a pressure sensitive bonding agent layer.

BRIEF DESCRIPTION OF DRAWINGS

FIGS. 1A to 1F are views for explaining steps for manufacturing a multi-layer optical fiber sheet according to an embodiment of the present invention.

FIGS. 3A to 3F are views for explaining steps for manufacturing a multi-layer optical fiber sheet according to other embodiment of the present invention.

FIG. 11A is a plan view of the optical fiber sheet before the manufacturing steps have not been completed. FIG. 11B is a plan view of the optical fiber sheet after the manufacturing steps have been completed.

BEST MODE FOR CARRYING OUT THE INVENTION

Preferable embodiments for a multi-layer optical fiber sheet, a manufacturing method for an optical fiber sheet, and an optical fiber sheet are explained below with reference to drawings. It is understood that the present invention is not limited to the embodiments below. For example, it is possible to combine each structural members in the embodiments preferably.

Also, in explanations for the embodiments below, it should be understood that n-core optical fiber indicates that n pieces of singe core optical fibers are disposed flatly so as to be formed in an optical fiber.

First Embodiment

A first embodiment of the present invention is explained as follows with reference to FIGS. 1A to 7.

Figure 2:
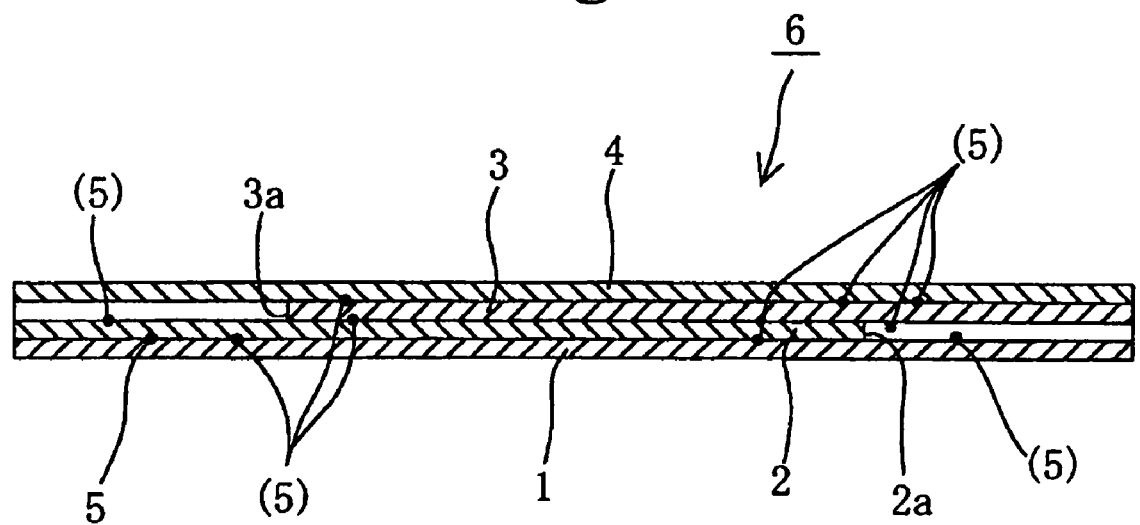
FIG. 2 is a cross section of FIG. 1A structurally viewed in a line A-A.

FIGS. 1A to 1F are views for explaining steps for manufacturing a multi-layer optical fiber sheet according to an embodiment of the present invention. FIG. 2 is a structurally enlarged cross section of FIG. 1F structurally viewed in a line A-A so as to show a relationship of each layer in a manufactured multi-layer optical fiber sheet. In the multi-layer optical fiber sheet shown in the drawing, quite a long extra length of optical fiber which is formed on the optical fiber wiring section is contained in the optical fiber sheet.

Here, a material for a sheet 1 is explained. A material member for a sheet which is used for outermost layers which are on top and the bottom of the sheet is a flexible resin sheet. The material member and the thickness are selected preferably in consideration of Young's modulus according to necessary factors such as handling operability, anti-abrasion, rigidity (anti-bending rigidity), and tensile strength. For example, for the material member, a film is used such as polyimide, polyethyleneterefthalate, low density or high density polyethylene, polyprophlene, polyester, nylon 6, nylon 66, ethylene-tetrafluoroethylene copolymer, poly 4-methylpentene, polyvinyllidene chloride, plasticized polyvinylchloride, polyetherester copolymer, ethylene-vinylacetate copolymer, soft polyurethane.

Here, it is possible to combine any of the sheet material. For example, it is possible to use the same material member as in the top layer and the bottom layer. Also, it is possible to use different material member in the top layer from the bottom layer. It may be acceptable if the thickness of the sheet may be the same as in top and bottom sheet. Also, it may be acceptable if the thickness of the sheet may be different between the top sheet and the bottom sheet. Also, a room temperature pressure sensitive bonding agent (adhesive agent) including a rubber or acryl is applied on a surface of the sheet member so as to attach together. Also, although an optical fiber which is disposed on the sheet is not limited particularly, so called a UV (ultraviolet) line (diameter 250 μm) which is formed by a UV resin coating on a bare fiber, or a silicon wire on which a silicon resin is coated is usually used. Also, it is possible to use an optical fiber cord of which optical fiber core and a protecting coat are reinforced, an optical fiber tape cord of which optical fiber tape core and a protecting coat are reinforced, and a carbon coat fiber according to necessity. Also, in the embodiments of the present invention, explanation is not limited to a case in which a first sheet is the bottom layer and a second sheet is the top layer. More importantly, an opposite structure is acceptable. If there are more than three sheets, it is acceptable if a sheet which is not disposed on the outermost layer may be the first sheet.

First, an optical fiber 5 is disposed on a first sheet 1 (bottom layer) as shown in FIG. 1A. A pressure sensitive bonding agent is applied on an upper surface of the sheet 1, and an optical fiber 5 is disposed thereon at a desirable pattern so as to be pushed by a slight pushing force. The optical fiber 5 adheres to the sheet; thus such a wiring condition is maintained. Here, the desirable pattern indicates a wiring condition in which overlapping optical fibers are prevented as much as possible so as to realize a sufficient curvature such that a bending loss of the light may be restricted in an acceptable range. For example, for a desirable pattern, it is possible to mention to a wavy shape, only a curved shape such as an ellipse or a circle, otherwise a combination of these shapes with a linear section. If the sheet 2 and the bottom sheet 1 is compressed to be attach together, they are hardly removed from each other; thus, position of an optical fiber which is disposed between the sheets 1 and 2 is fixed by an adhesive member.

The above feature such as thickness of the sheet, a compressing operation for the sheet, and a desirable pattern can be employed preferably in the rest of the embodiments of the present invention.

Here, in FIG. 1A, it is understood that a region which is indicated by an arrow "a" is used for inputting purpose.

Also, as understood from the drawing, an outputting region for the optical fiber 5 is omitted in the drawing.

Next, as shown in FIG. 1B, a second sheet 2 in which, for example, a rectangular notched section 2a is formed as an interlayer communicating section is applied in a right-bottom region in the drawing for a viewer on the first wired sheet 1. This sheet 2 is an interlayer sheet in which thick pressure sensitive bonding agent (adhesive member) is disposed between dual-surfaced removal papers (separators). Here, a removal paper is removed so as to expose an adhesive layer so as to be compressed in a predetermined position of the sheet 1 such that the optical fiber is sandwiched therebetween. After the sheet 2 is compressed to be attached with the sheet 1, the other removal paper on the sheet 2 is removed so as to expose the pressure sensitive bonding agent (adhesive member). That is, the sheet 2 is formed only by a pressure sensitive bonding agent layer.

Next, as shown in FIG. 1C, an outputting region of the optical fiber 5 which is disposed on the first sheet 1 is introduced on the second sheet 2 via the notched section 2a so as not to expand over the sheet; thus, the optical fiber 5 is disposed on the second sheet 2. Here, in FIG. 1C, wiring section in a first wiring layer (a region which is indicated by a broken line in FIG. 1B) is omitted.

Next, as shown in FIG. 1D, a sheet 3 having a rectangular notched section 3a formed in a upper-left region for the viewer in the drawing is applied on the wired second sheet 2 such that the rectangular notched section 3a should be disposed in different position (in different corner in this embodiment) from a position of the notched section formed on the second sheet 2. The sheet 3 is also an intermediate layer which has a similar structure with the second sheet 2. Here, an order for applying the sheets is similar to the above case; thus, explanation is omitted.

Next, as shown in FIG. 1E, as similar to the previous step, an outputting region of the optical fiber 5 which is disposed on the second sheet 2 is introduced on the third sheet 3 via the notched section 3a so as to be disposed on the third sheet 3. Here, in FIG. 1E, wiring section in a second wiring layer (a region which is indicated by a broken line in FIG. 1D) is omitted.

Next, as shown FIG. 1F, a top fourth sheet 4 which has the same shape as the bottom sheet 1 is applied on the wired third sheet 3. The pressure sensitive bonding agent is applied on a surface of the sheet 4. By doing this, a multi-layer optical fiber sheet 6 is formed in which optical fibers are disposed over three wiring layers (wiring planes).

As an entire result, an intermediate layer which is formed by a plurality of layers of pressure sensitive bonding agent is formed between the material members for the sheets which are layered vertically, and optical fibers are disposed so as to be embedded on a plurality of different planes (wiring planes) in the intermediate layers.

In such an intermediate layer, there is a case in which it is difficult to separate the layers because the layers are unitarily formed by a compressing operation; thus, a border between the adhesive layers is not clear, or there is no border betwee the adhesive layers. However, such an intermediate layer can be a plurality of wiring layers (multi-layer) because there are a plurality of wiring planes in the optical fiber viewed in a cross section of the optical fiber sheet. Therefore, such an intermediate layer can be in a range of the present invention. That is, in the present invention, an intermediate layer for fixing the optical fiber is formed between the optical fiber sheets which are layered vertically, and the optical fiber has different wiring planes in the intermediate layers. Additionally, optical fiber paths which communicates among the wiring planes (layers) are formed inside the optical fiber sheet. Although the intermediate layer is formed by an acrylic pressure sensitive bonding agent (adhesive agent), it is not necessary that the intermediate layer should maintain an adhesive characteristics after it is applied on the sheet. That is, an object of the intermediate layer is to maintain a wiring condition of the disposed optical fibers flexibly; therefore, a material for the intermediate layer is not limited to a material member which has a common adhesive agent. It is in a range of the present invention if a material member which has an aging characteristic so as to become a rubber elastomer after being attached or a material member which decomposes according to a thermal history is used for the intermediate layer.

Here, in the above explanations, a sheet which is formed by disposing a thick pressure sensitive bonding agent (adhesive agent) between double-surfaced removal papers is used for each intermediate layer. However, it is possible to use a sheet in which a pressure sensitive bonding agent is applied on both sides of the material members for the sheet which is similar to the outermost layer as a part of the intermediate sheet as an object for enhancing a rigidity of the sheet. Furthermore, the intermediate layer may be a composite in which several sheets having only an adhesive agent and sheets having a material member are combined.

Inside the above multi-layer optical fiber sheet 6, quite a long extra length of the optical fiber 5 is contained. Here, the optical fiber 5 is disposed over three wiring layers (wiring planes). Therefore, although a sheet area is limited, the optical fibers 5 which are disposed in each wiring layer are not so dense (crowded). Therefore, the optical fibers do not cross each other in each wiring layer. Otherwise, only a few optical fibers cross each other even if there is such optical fibers which are crossing each other. The neighboring sheets which are layered vertically are contacting each other closely; thus, the optical fibers are fixed reliably; thus, there is not a concern that the optical fibers move in the sheet. Therefore, there is not a concern that the optical fibers may be disposed inaccurately on the sheet such that the optical fibers may be damaged when the optical fiber sheet is assembled in a device.

Also, it is possible to prevent a multiple crossing region in which a plurality of optical fibers cross collectively. Thus, there is not a problem in that there may be an unacceptable range of bending in the optical fibers in such a multiple crossing region. Nevertheless each optical fiber is drawn from a region near the sheet in the present embodiment, positions from which each optical fiber is drawn thereout is different when viewed from a cross sectional direction of the sheet. Therefore, there is not a multiple crossing between the optical fibers. Otherwise, even if there is a multiple crossing between the optical fibers, it is possible to design a wiring shape in which there may be less number of multiple crossings.

Although the above embodiment employs a four-layer structure in which two intermediate layers are used, it is possible to select the quantity of the intermediate layer and total layers preferably. A order for disposing wirings is the same as in each example; therefore, explanations for such an order is omitted.

Furthermore, in the above embodiment, an example for a case in which an optical fiber is disposed in an multi-layer optical fiber sheet is shown. However, in a case in which a plurality of optical fibers are disposed, density of the wirings is conspicuous; therefore, the present invention is particularly effective for a case in which a plurality of optical fibers are disposed. FIGS. 3A to 3F are showing manufacturing steps for a multi-layer optical fiber sheet 6A in which two single core optical fibers (or a single two-core optical fiber tape) are disposed.

In the manufacturing steps for the multi-layer optical fiber sheet 6A, the steps shown in FIGS. 3A to 3D correspond to FIGS. 1A to 1D except that two optical fibers are used (two optical fibers are indicated by reference numerals 5 and 5'). In FIG. 3E, an optical fiber is introduced onto a third sheet 3 via a notched section 3a so as to be disposed on the third sheet 3 as similar to FIGS. 1A to 1F. In contrast, the other optical fiber 5' is not disposed on the sheet 3. Instead, the optical fiber 5' is drawn out of the sheet. Consequently, a fourth sheet 4 is applied thereon. Thus, a multi-layer optical fiber sheet 6A in which two optical fibers 5 and 5' are disposed over three layers is manufactured.

Also, although it is not explained later, in a case in which n-core optical fiber tape (n is an integer) is used, the above wiring disposition is performed by cutting the n-core optical fiber tape into a single core optica fiber at a preferable position on the sheet; thus, the optical fiber which is cut is drawn out of the sheet similar to the above explanation.

Figure 4:
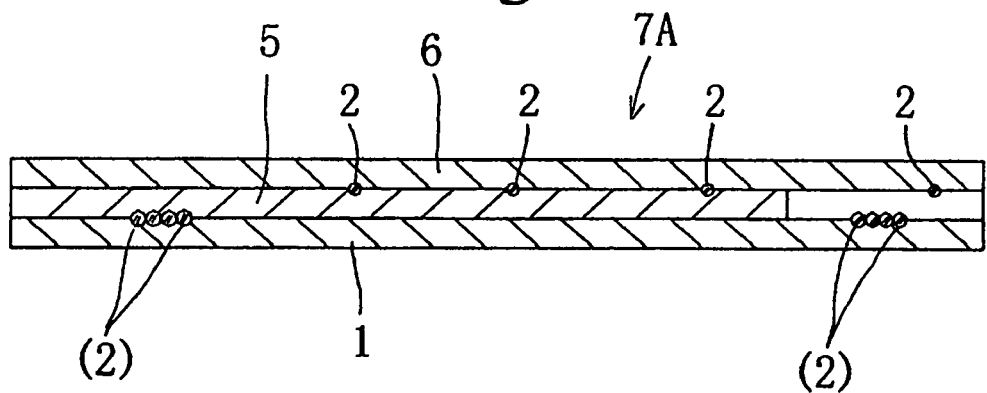
FIG. 4 is a view for explaining a modified example for the embodiment shown in FIG. 3.
Figure 5:
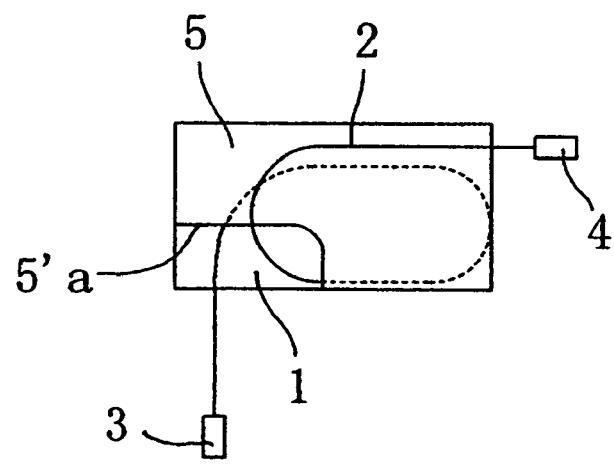
FIG. 5 is a plan view of a multi-layer optical fiber sheet according to further other embodiment of the present invention.

In the above example, although the other optical fiber 5' is drawn out of the sheet from the notched section 3a as shown in FIGS. 3D and 3E, it is possible to select the region for drawing out the optical fiber preferably. For example, as shown in FIG. 4, the optical fiber 5' may be drawn out of the sheet horizontally from, for example, a left member of the sheet. Here, it is possible to draw the optical fiber from a common member of the sheet (in the same direction) such that an exit position of the optical fiber is shifted from an exit position on the other layer.

Also, in case in which, for example, four optical fibers (or a four-core optical fiber) are disposed, it is possible to draw the optical fibers from four directions on the sheet.

By doing this, in case in which it is necessary to draw a plurality of disposed optical fibers in plural directions, it is possible to draw the optical fibers from plural directions easily without a multiple crossing. That is, it is possible to draw the optical fibers from plural regions.

Figure 6:
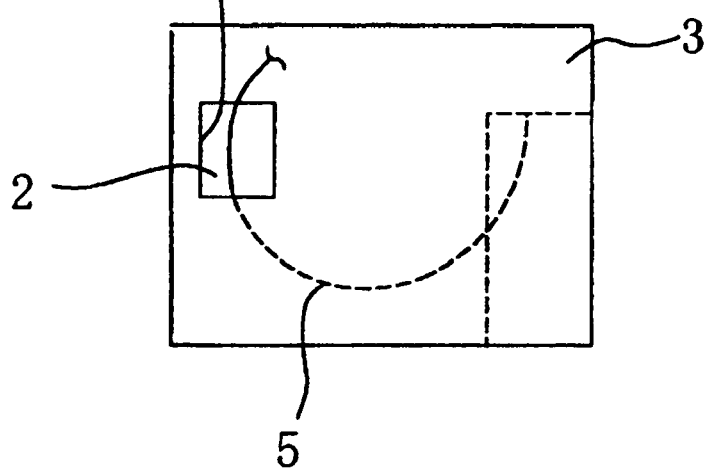
FIG. 6 is a plan view of a multi-layer optical fiber sheet according to further other embodiment of the present invention which corresponds to FIG. 1D showing a manufacturing step.

In the above embodiment, a notched section is formed on the sheet for a linear interlayer communicating section. More importantly, it is acceptable if a hole 3b is formed for an interlayer communicating section as shown in FIG. 6. FIG. 6 corresponds to a step shown in FIG. 1D among manufacturing steps shown in FIGS. 1A to 1F. Here, an outputting section of the optical fiber 5 which is disposed on the second sheet 2 is introduced onto the third sheet 3 via the hole 3b so as to be disposed on the third sheet 3.

Here, if either one of the neighboring sheets is smaller than the other sheet, that is, if a longitudinal width and a latitudinal width are narrower, it is possible to form a non-conforming section.

Second Embodiment

It is possible to form a following structure for a second embodiment of the present invention.

① Shape of the notched section for an interlayer communicating section or a hole are not limited in a rectangular; thus, any shape is acceptable.

That is, it is important that the shape of the intermediate sheet should not conform with the shape of the neighboring sheet such as a sheet therebeneath. Such a non-conforming section forms an interlayer communicating section. For example, when a first intermediate sheet having a narrower width than that in the sheet 1 of the present embodiment is used, a region in which the shape of both sheets does not coincide forms an interlayer communicating section.

② Also, in a case in which a first intermediate sheet 2 having narrower longitudinal width and narrower latitudinal width than those in the sheet 1 is used, a non-conforming section forms an interlayer communicating section.

Figure 7:
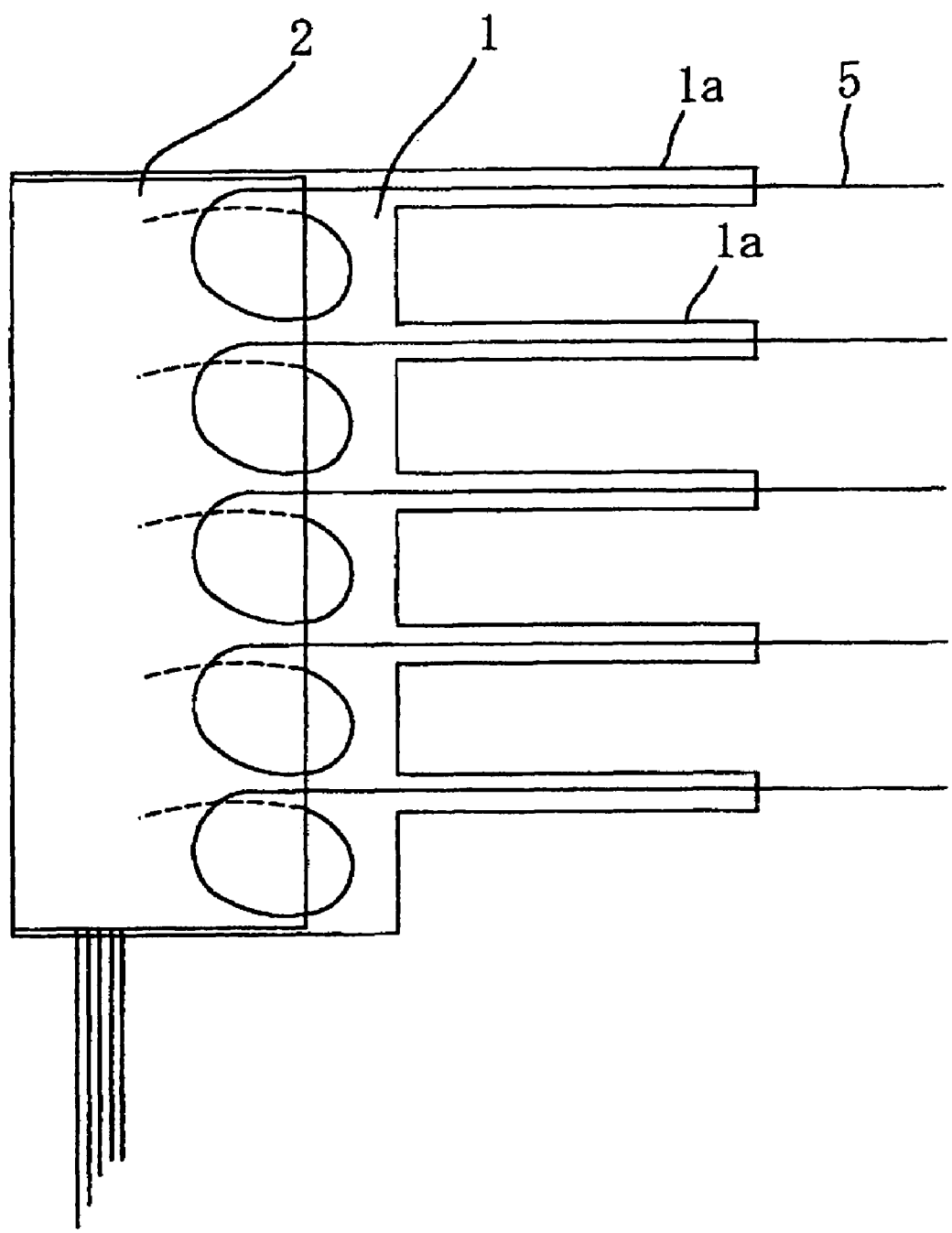
FIG. 7 is a plan view of a multi-layer optical fiber sheet according to further other embodiment of the present invention.

③ In a case in which a sheet 1 is formed like a comb such that a plurality of drawn sections 1a are formed as shown in FIG. 7, if a shape a first intermediate sheet 2 is different (a rectangular shape in an example shown in drawing) from a shape of the sheet 1 as shown in the drawing, an interlayer communicating section is formed similarly.

④ It is sufficient if an interlayer communication section is formed in the intermediate sheet; thus, it is certain that the intermediate layer should not be formed on the bottom sheet and on the top sheet necessarily. However, the present invention does not eliminate a case in which notched section and a hole for other object can be formed on the bottom sheet and on the top sheet.

⑤ A multi-core optical fiber is introduced from a certain end so as to be branched in a multi-core manner inside the sheet so as further to branch them into a single-core optical fibers or a less multi-core optical fibers. For example, it is possible to mention a case in which an eight-core optical fiber tape is inputted so as to be cut into four pieces of two-core optical fibers (tapes). Alternatively, it is possible to mention a case in which an eight-core optical fiber tape is inputted so as to be cut into eight pieces of single-core optical fibers. It is acceptable if a divided optical fiber may be introduced to an exit. It is also acceptable if the optical fiber may be separated in an intermediate sheet so as to be branched in a plurality of exits.

⑥ Regarding a method for disposing an extra length of the optical fiber, there is a case in which the optical fibers are disposed so as not to cross and overlap vertically in a layer (wiring plane). Also, there is a case in which the optical fibers are disposed so as to cross and overlap vertically in a layer. The wiring condition is determined according to a specification of a product desirably.

⑦ It is sufficient as long as a position and a shape of the interlayer communicating sections do not coincide and overlap completely. The present invention does not eliminate a case in which a position and a shape of the interlayer communicating sections may coincide partly.

Third Embodiment

A third embodiment of the present invention is explained with reference to FIGS. 8A to 8F, 9, 10, 4, and 5. A portion of the optical fiber which is drawn out of the sheet is covered by a reinforcing tube which is provided with a reinforcing texture layer. In particular, when an optical connector is attached, it is necessary to cover the optical fiber by the reinforcing tube in advance. For an optical connector (optical ferrule), a common single-core SC optical ferrule can be used. Also, a multi-core MT optical ferrule can be used preferably.

Figure 8:
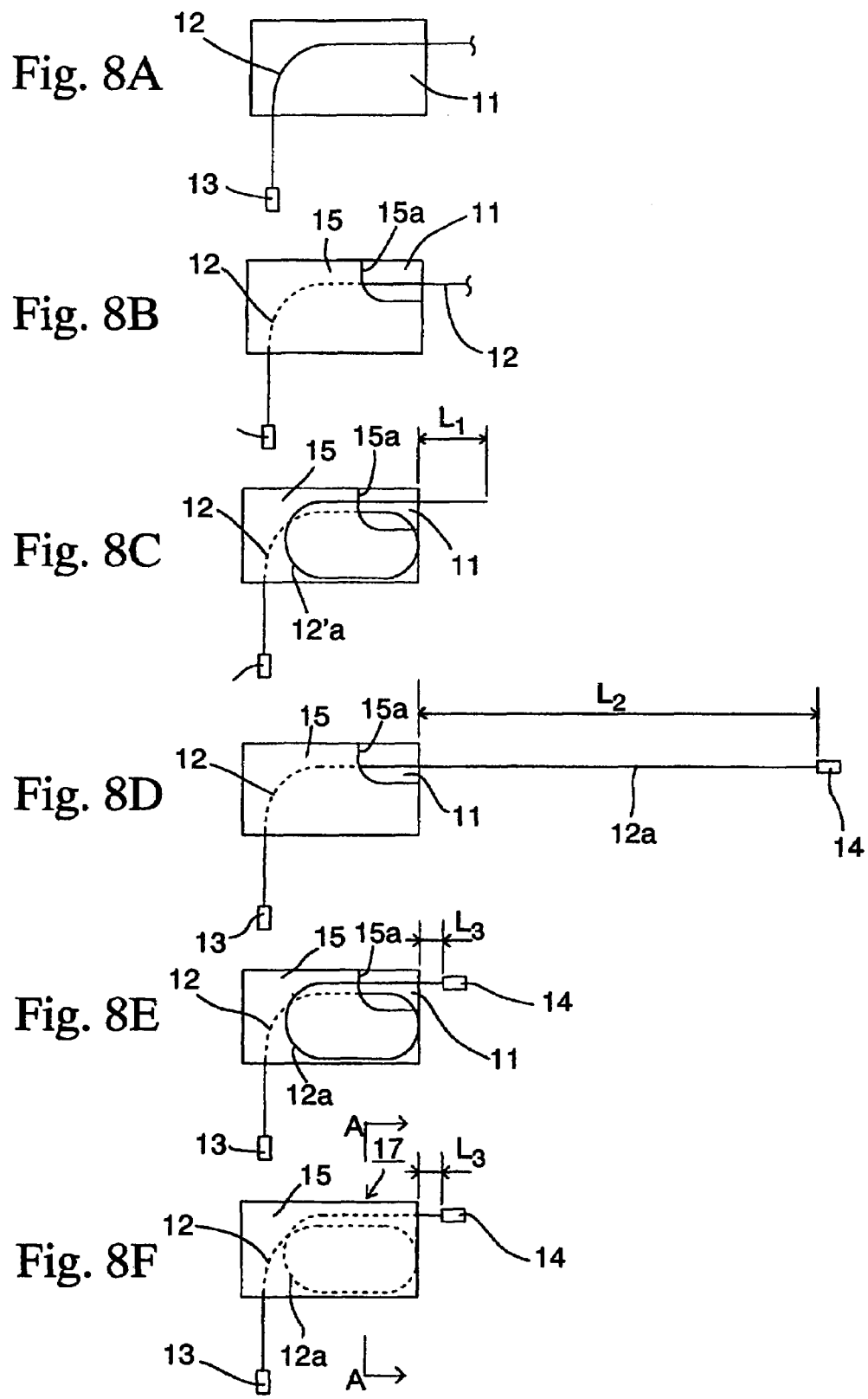
FIGS. 8A to 8F are views for explaining a method for manufacturing an optical fiber sheet according to an embodiment of the present invention such that an optical fiber sheet should be manufactured in the steps in an order from 8A to 8F.
Figure 9:
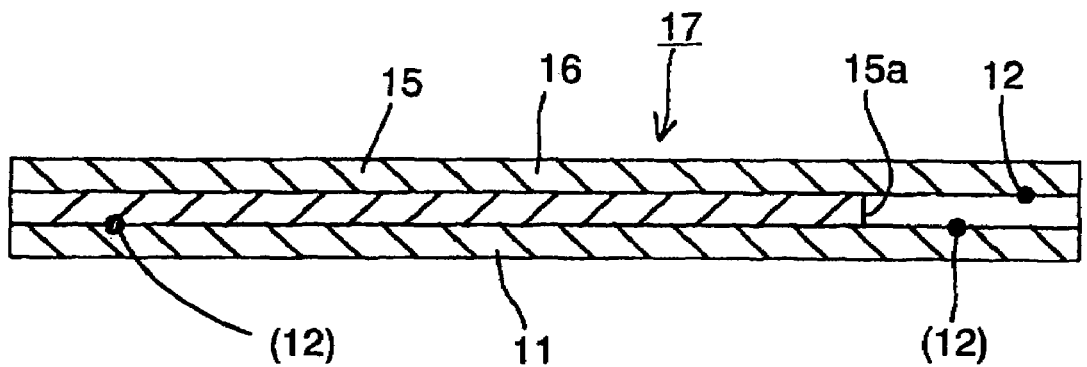
FIG. 9 is a cross section of FIG. 8F viewed in a line A-A.

FIGS. 8A to 8F are views for explaining a method for manufacturing an optical fiber sheet of the present invention. FIG. 9 is an enlarged cross section of manufactured optical fiber sheet FIG. 8C viewed in a line A-A. First, as shown in FIG. 8A, an optical fiber 12 is disposed on a flexible resin sheet (a first sheet) 11 on which a pressure sensitive bonding agent is applied. In the drawing, an example for a case in which an optical fiber 12 in which an optical fiber connecter 13 is attached to an inputting section is disposed on the sheet, and an optical connector 14 (see FIGS. 8D to 8F) is attached to an outputting section is shown.

Here, a material for a sheet 11 is explained. A material member for a sheet which is used for outermost layers which are on top and the bottom of the sheet is a flexible resin sheet. The material member and the thickness are selected preferably in consideration of Young's modulus according to necessary factors such as handling operability, anti-abrasion, rigidity (anti-bending rigidity), and tensile strength. For example, for the material member, a film is used such as polyimide, polyethyleneterefthalate, low density or high density polyethylene, polyprophlene, polyester, nylon 6, nylon 66, ethylene-tetrafluoroethylene copolymer, poly 4-methylpentene, polyvinyllidene chloride, plasticized polyvinylchloride, polyetherester copolymer, ethylene-vinylacetate copolymer, soft polyurethane.

Also, it is possible to combine any of the sheet material. For example, it is possible to use the same material member as in the top layer and the bottom layer. Also, it is possible to use different material member in the top layer from the bottom layer.

Also, a room temperature pressure sensitive bonding agent (adhesive agent) including a rubber or acryl is applied on a surface of the sheet member so as to attach together. Also, although an optical fiber which is disposed on the sheet is not limited particularly, so called a UV (ultraviolet) line (diameter 250 μm) which is formed by a UV resin coating on a bare fiber, or a silicon wire on which a silicon resin is coated is usually used. Also, it is possible to use an optical fiber cord of which optical fiber core and a protecting coat are reinforced, an optical fiber tape cord of which optical fiber tape core and a protecting coat are reinforced, and a carbon coat fiber according to necessity.

Next, as shown in FIG. 8B, a second sheet 15 which is supposed to be an intermediate layer having, for example, a rectanbular notched section 15a for an interlayer communicating section is attached in a right-top region of the sheet 11 for a viewer on the first wired sheet 11. The sheet 15 is formed by disposing a thick pressure sensitive bonding agent (adhesive agent) layer between a double-surfaced removal papers such that an adhesive layer is exposed by removing a removal paper so as to be compressed to be attached in a predetermined position on the sheet 11 so as to dispose the wired optical fiber 12 therebetween. After the sheet 15 is compressed to the sheet 11 therebeneath, the other removal paper is removed so as to expose the pressure sensitive bonding agent (adhesive agent). That is, the sheet 15 is formed only by a layer of the pressure sensitive bonding agent.

Next, as indicated by a line in FIG. 8C, the optical fiber 12 is bent downwardly in the drawing in the notched section 15a so as to dispose an extra length portion of the optical fiber 12 tentatively on the attached sheet 15. The extra length part which is tentatively disposed to roll around on the sheet 15 is indicated by reference numeral 12'. In such a tentative disposition, when the extra length portion of the optical fiber 12 which is tentatively disposed is compressed on the sheet 15 by a slight force, it is possible to remove easily therefrom later. Consequently, the drawn part of the optical fiber is cut such that a predetermined length $L_1$ is drawn from a marginal end of the sheet. The drawn length $L_1$ corresponds to a final position in which the optical connector 14 is attached as shown in FIG. 8E.

The attaching operation for the optical connector under the above condition is not satisfactory; next, the extra length part 12' which is tentatively disposed is removed so as to draw the optical fiber 12 straightly so as to attach the optical connector 14 in a tip of the optical fiber 12 as shown in FIG. 8D. In such a case, an extra length part 12a to which the optical connector 14 is supposed to be attached such as an extra length section $L_2$ of the optical fiber 12 is sufficiently long; it is easy to attach the optical connector 14.

Next, as shown in FIG. 8E, the extra length section (also indicated by reference numeral 12a) is disposed on a surface of the sheet 15. If such an extra length section for the optical connector 14 is disposed successfully for the first time, the extra length section is disposed in the same pattern as the tentative disposition pattern shown in FIG. 8C. By doing this, it is possible to attach the optical connector 14 according to a designed distance $L_3$ (or $L_1$) from the marginal end of the sheet correctly. Therefore, it is possible to manufacture an optical fiber sheet having a short extra length section (a distance $L_3$ from the marginal end of the sheet to the rear end of the optical connector is short) easily. Also, it is possible to manufacture an optical fiber sheet having no extra length section (a distance $L_3$ is zero) easily.

In a case in which the optical connector 14 cannot be attached successfully in a manufacturing step shown in FIG. 8D because a sufficient optical performance cannot be realized or the optical fiber is broken, it is possible to cut the tip of the optical fiber 2 so as to attach the optical connector 4 again because there is a sufficient extra length to be attached. Here, if the extra length section 12a is disposed on a surface of the sheet 15, the extra length section 12 is slightly different from the tentative disposition pattern shown in FIG. 8C because the extra length section 12a is slightly short. Although the disposing operation should be performed in consideration of the above difference, it should be noted that there may be a case in which there may not be a region for rolling the optical fiber in the sheet.

Next, as shown in FIG. 8F, a sheet 16 (third sheet) on which surface a pressure sensitive bonding agent is applied having an area for covering the notched section 15a is attached on the sheet 15 in which an extra length section is formed. By doing this, a two-layer structure optical fiber sheet 17 is manufactured in which an optical fiber for the outputting use is disposed on a layer (wiring plane) which is different from the optical fiber for the inputting use and the sheet 15.

In the above explanation, although a case in which only an optical fiber 12 is disposed in the optical fiber sheet 17 is explained, a lot of optical fibers are disposed usually. Embodiments shown in FIGS. 10 and 4 relates to a optical fiber sheet in which, for example, four optical fibers 12 are disposed. Here, an inputting section is an optical fiber tape in which four pieces of single-core optical fibers 12 are bundled. Additionally, the optical fiber tape is attached to a four-core optical fiber connector 13A so as to be disposed on the optical fiber sheet 1. The disposed optical fiber tape is cut into a single-core optical fiber 12a in the sheet so as to be drawn out of the sheet. An optical connector for a single-core optical fiber is attached on a tip of the single-core optical fiber 12a.

Here, any desirable number of optical fibers can be disposed. For example, it is acceptable if the inputting section is a four-core optical fiber tape so as to be cut into optical fibers having less number of cores such as a single-core optical fiber tape or a two-core optical fiber tape.

In this case, the optical fiber has a dimensional two-layer structure; therefore, even if the extra length section (upper wiring layer) is disposed so as to overlap the necessary wiring section (lower wiring layer), the optical fibers are not disposed crowdedly. Thus, it is possible to avoid the multiple crossing of the optical fibers easily. Therefore, it is not necessary to form an extra area for containing such an extra length section by enlarging the sheet area.

Consequently, it is possible to obtain a sufficient extra length section 12a; therefore, it is possible to attach the optical connector 14 by an accurate distance from the marginal end of the sheet. Furthermore, it is possible to realize a low skew (reduce uneven distance from the marginal end of the sheet). By doing this, it is not necessary to form an extra length area in addition to a necessary wiring area for the optical fiber so as to realize a low skew.

Figure 10:
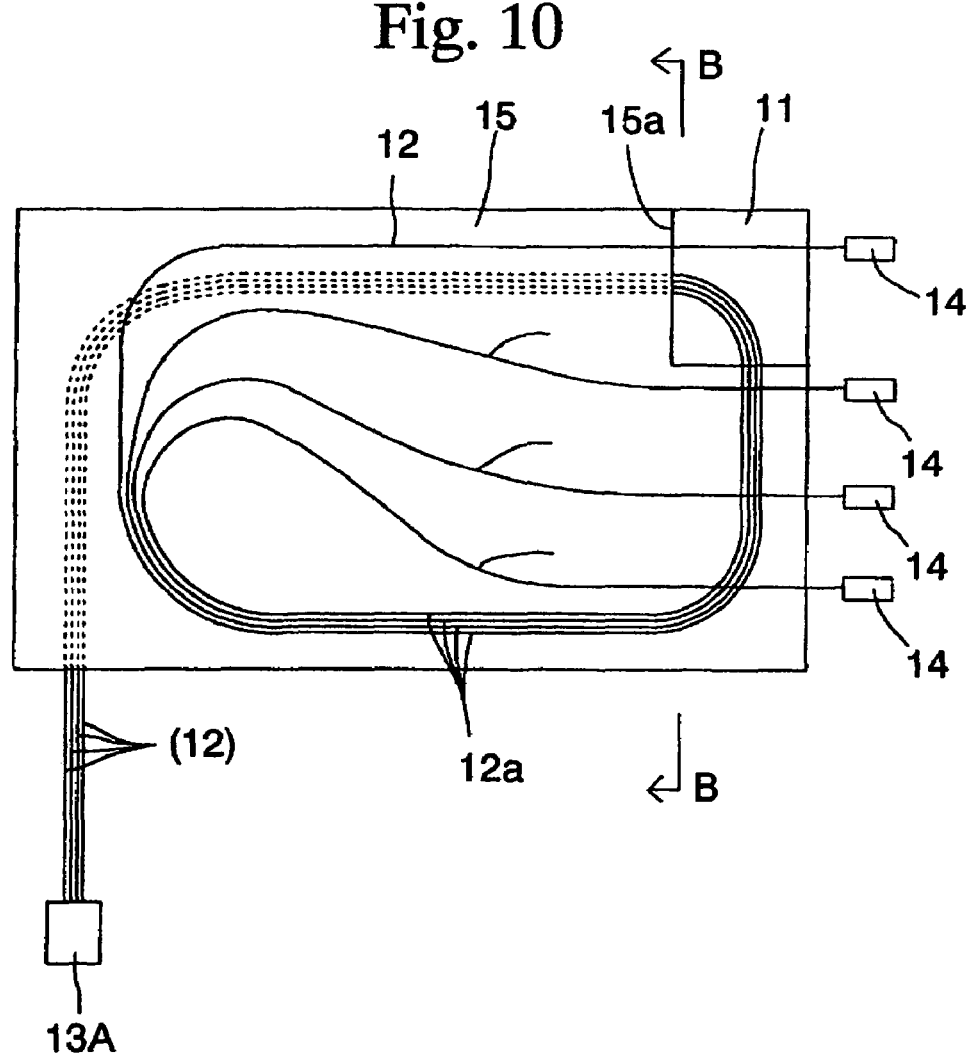
FIG. 10 is a cross section of an optical fiber sheet for other embodiment of the present invention.

Here, FIG. 10 corresponds to a manufacturing step shown in FIG. 8E in which an optical fiber sheet 17A is manufactured by attaching a third sheet 16 on the sheet 15 in which an extra length section 12a of the optical fiber is disposed as shown in FIG. 4.

Here, in the embodiments shown in FIGS. 10 and 4, the notched section 15a which is supposed to be formed on the sheet 15 for disposing an extra length section is disposed in a marginal end section in an outputting section of the optical fiber sheet. Here, it is possible to dispose the notched section 15a' in an inputting section shown in FIG. 5 which shows a corresponding manufacturing step s to that of FIG. 8F. That is, it is possible to form a notched section in the marginal end section in either one of the sheet of the optical fiber which is disposed on the optical fiber sheet. Although it is not shown in the drawing particularly, it is possible to form on both the inputting section and the outputting section.

Figure 11A:
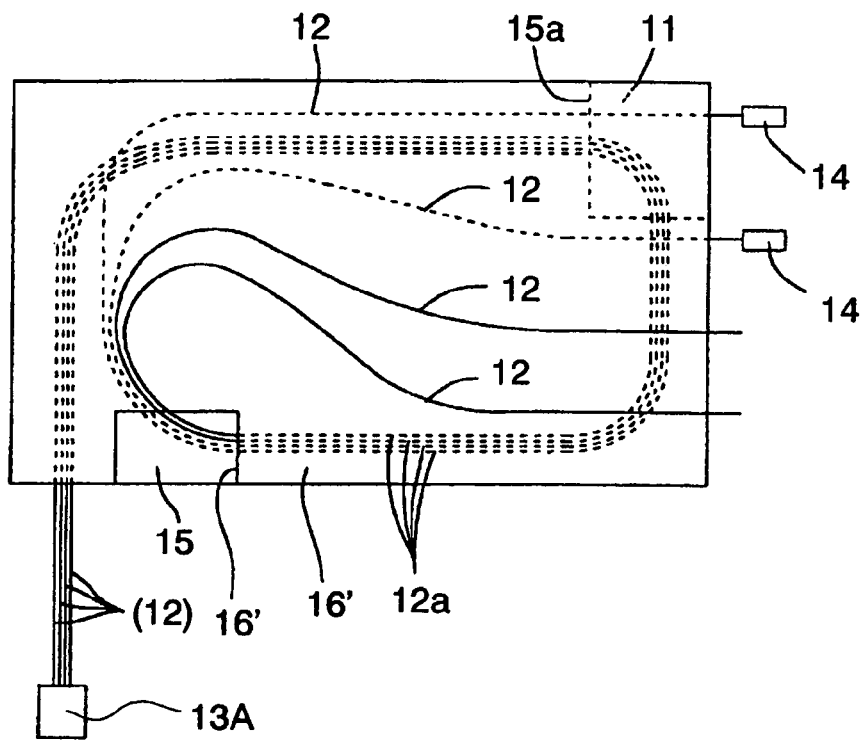
FIGS. 11A and 11B show an optical fiber sheet according to further other embodiment.
Figure 11B:
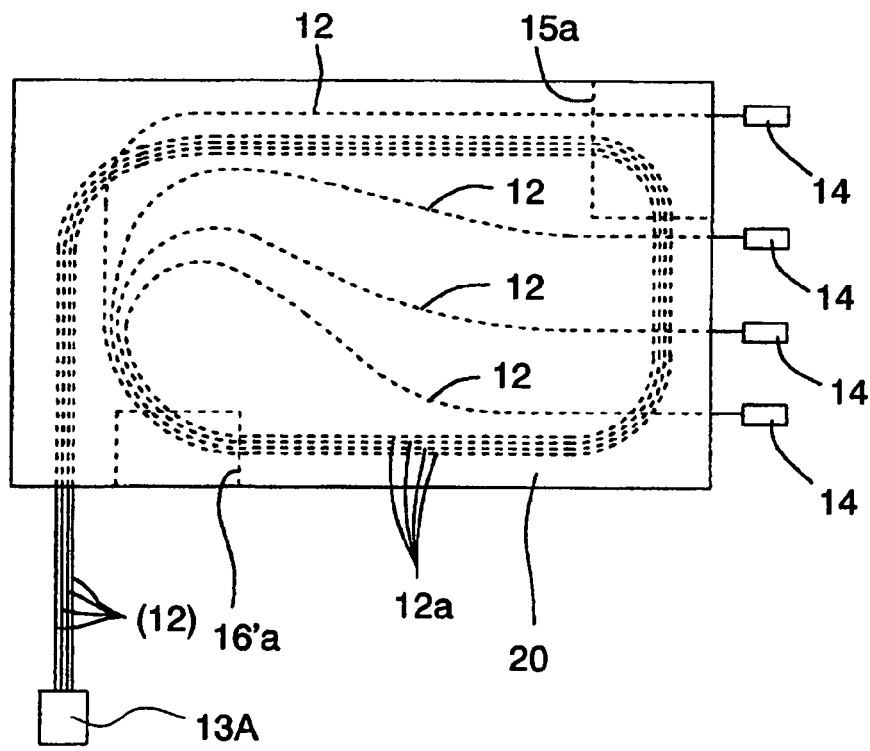

Although the above embodiment employs two-layer structure, the present invention can be applied to a case in which more than three-layer structure is employed. As shown in FIGS. 11A and 11B, when four optical fibers (quantity of core can be determined preferably whether to use four pieces of single-core optical fibers or a four-core optical fiber) is disposed, four optical fibers 12 which are disposed on the first sheet 11 are drawn out from the notched section 15a formed on the second sheet 15 which is supposed to be an intermediate layer so as to form an interlayer communicating section; thus, the optical fibers are disposed on the second sheet 15. In such a case, after two optical fibers 12 are removed, optical connector is attached so as to dispose the optical fiber again (see FIG. 11A).

Furthermore, the rest of two optical fibers 12 are drawn out from the notched section 16'a which is formed on the third sheet 16' which is supposed to be an intermediate layer so as to be attached on the second sheet 15 so as to be disposed on the third sheet 16'. In such a case, after the tentative disposed wiring is removed, the optical connector is attached according to the above method so as to dispose the optical fiber again. Next, a fourth sheet 20 is attached thereon (see FIG. 11B).

Here, in the above case, it is acceptable if the extra length for attaching the optical connector 14 to the two optical fibers 12 on the second sheet 15 may be the same the extra length for attaching the optical connector 14 to the optical fibers 12 on the third sheet 16'. Alternatively, the extra length for attaching the optical connector 14 to the two optical fibers 12 on the second sheet 15 may be different from the extra length for attaching the optical connector 14 to the optical fibers 12 on the third sheet 16'.

Also, in the above embodiments, there may be a case in which it is difficult to see a border between the sheets or layered sheets may externally look as if they are unitarily formed because a plurality of intermediate layers are made of adhesive layers. The present invention includes such a case because wiring planes for the optical fibers are different. It is difficult to separate such interlayers which are usually unitarily compressed. Otherwise, the border between the adhesive layers are unclear. Furthermore, there may be a case in which there is no border between the adhesive layers. In such a case, there are a plurality of wiring planes for the optical fibers when viewed from a cross section of the optical fiber sheet; it is possible to understand that such a structure may be a plurality of wiring layers (multi-layers). Therefore, such a structure can be included in a technical scope of the present invention.

That is, in the present invention, an intermediate layer for fixing an optical fiber between optical fiber sheets which are layered vertically is disposed, and the optical fiber has different wiring planes in the intermediate layer. Consequently, the optical fiber paths which communicate among the wiring planes (layers) are formed inside the optical fiber sheet. Although the intermediate layer is an acrylic pressure sensitive bonding agent (adhesive agent) layer, it is not necessary to maintain such adhesion after the sheet is attached. That is, object of the intermediate layer is to maintain a wiring condition of the disposed optical fibers flexibly; therefore, a material for the intermediate layer is not limited to a material member which has a common adhesive agent. It is in a range of the present invention if a material member which has an aging characteristic so as to become a rubber elastomer after being attached or a material member which decomposes according to a thermal history is used for the intermediate layer.

Here, in the above explanations, an intermediate sheet which is formed by disposing a thick pressure sensitive bonding agent (adhesive agent) between double-surfaced removal papers is used for each intermediate layer. However, it is possible to use a sheet in which a pressure sensitive bonding agent is applied on both sides of the material members for the sheet which is similar to the outermost layer as a part of the intermediate sheet as an object for enhancing a rigidity of the sheet. Furthermore, the intermediate layer may be a composite in which several sheets having only an adhesive agent and sheets having a material member are combined.

Fourth Embodiment

It is possible to employ a following structure as a fourth embodiment of the present invention below.

① Interlayer communicating section is a general term for a section which communicates between the wiring planes. Therefore, the shape and the position of the interlayer communicating section can be determined desirably. In a sheet having a narrower width than the shape of the hole or the width in the other sheet, it is possible to form an interlayer communicating section in such a narrow section. Also, it is sufficient if the position and the shape of the interlayer communicating section may coincide completely. That is, it is acceptable even if a part of the position and the shape of the interlayer communicating section may overlap.

② It is not limited whether or not the optical fiber must be drawn out from a member of the sheet. The present invention can be applied to a case in which the optical fiber may be drawn out from a plurality of members of the sheet (from different exits).

Furthermore, there is a case not only in that the optical fiber is drawn out from the notched section but also in that the optical fiber is drawn out of the sheet from the other section.

③ The present invention can be employed to a case in which an optical fiber which is provided with an optical connector and an optical fiber which is not provided with an optical connector are used together.

④ A object of the tentative disposing step for the optical fibers on the intermediate layer is to enhance an working operability for adjusting the extra length of the optical fibers which are drawn out of the sheet. Therefore, it is possible to attach the optical connector by cutting the optical fiber not via the tentative disposing operation, and after that, it is possible to dispose the optical fibers on the sheet finally.

⑤ The present invention can be employed for forming a part of layers in a multi-layer wiring structure. That is, it does not mean that the first sheet should be limited either one of the sheets which are layered vertically. It should be understood that the first sheet indicates either one of a plurality of sheets. That is, in the present invention, a term such as $n_{th}$ sheet (n is an integer) is used for indicating a relative position in the disposed wiring section.

INDUSTRIAL APPLICABILITY

According to the present invention, when an multi-layer optical fiber sheet is formed, an interlayer communicating section such as a notched section or a hole is formed on the sheet; thus, the optical fiber communicates to a region between the wiring planes via the interlayer communicating section. Therefore, there are less dense optical fibers in each wiring planes; thus, the sheets which are neighboring vertically contact sufficiently closely; thus, the optical fibers are fixed reliably. Therefore, it is possible to reduce a necessary sheet area. Thus, there is no concern in that the optical fiber is disposed in an undesirable position when assembled in the device and there occurs a microbent which damages the optical fiber.

Also, it is possible to prevent a multiple crossing section in which a plurality of optical fibers cross each other collectively from occurring; therefore, there is no problem in that an insufficient contact in such a multiple crossing section or a bending of the optical fiber in an unacceptable range may occur.

Also, when it is necessary to draw a plurality of disposed optical fibers into a plurality of directions, it is possible to draw the optical fibers in a plurality of directions without causing a multiple crossing.

Also, according to a method for manufacturing an optical fiber sheet of the present invention, optical fibers are disposed so as to form at least a two-layer structure in an optical fiber sheet in which optical fibers are drawn out from an interlayer communicating section which is formed in the intermediate sheet in a three-layered sheets apart from the sheets. Therefore, by disposing the optical fibers tentatively or disposing the optical fibers again, it is possible to obtain a sufficient extra length section or more extra length section for re-disposition in the optical fibers which are supposed to be disposed, for example, when optical fibers are attached to the optical fiber which expands from the sheet near the marginal end of the sheet. Therefore, it is possible to attach the optical connectors to the optical fibers which expand from the sheet near the marginal end of the sheet easily. Also, it is possible to attach optical connectors having a short extra length section of the optical fiber which expands from the marginal end of the sheet. Also, it is possible to attach optical connectors having no extra length section of the optical fiber.

Also, the disposed optical fibers have at least a two-layer wiring planes when the optical connectors are attached to a plurality of the optical fibers near the marginal end of the sheet. Therefore, it is possible to avoid a multiple crossing of the optical fibers easily in which the optical fibers are not crowded even if the extra length section is disposed so as to overlap the necessary wiring section. Therefore, it is not necessary to form a surplus area for the are for containing the extra length section.

Also, it is possible to obtain a sufficient extra length section in each optical fiber; it is possible to attach the optical connector easily such that a distance from the marginal section of the sheet may be adjusted constantly and accurately. Therefore, it is possible to realize a low skew in which an unevenness of the position of the optical connectors is satisfactorily small.

Furthermore, if the optical connectors cannot be attached to the either one of the optical fibers successfully, and it is necessary to cut the failed connection and attach new optical connectors again for attaching the optical connectors to a plurality of optical fibers, it is possible to adjust the length of the expanded optical fibers in a predetermined length by adjusting the extra length section (curvature) of the optical fiber on the sheet.

The invention claimed is:

1. A method for manufacturing an optical fiber sheet comprising the steps for:
   disposing optical fibers on a first sheet by a desirable pattern;
   applying a second sheet on the first sheet so as to have an interlayer communicating section therebetween;
   attaching an optical connector on a tip of an optical fiber which is drawn out of the sheets;
   disposing the optical fiber to which the optical connector is attached on the second sheet via the interlayer communicating section; and
   applying a third sheet on the second sheet.

2. A method for manufacturing an optical fiber sheet according to claim 1 further comprising the steps for:
   disposing an optical fiber tentatively on the second sheet such that a predetermined length of the optical fiber should be drawn out of an end margin of the sheet;
   removing the optical fiber which is tentatively disposed on the second sheet;
   attaching an optical connector on a tip of the removed optical fiber;
   disposing the optical fiber on the second sheet again; and
   applying the third sheet to the second sheet.

3. A method for manufacturing an optical fiber sheet according to claims 1 or 2 wherein the optical fiber is drawn out to the interlayer communicating section.

4. A method for manufacturing an optical fiber sheet comprising the steps for:
   disposing optical fibers on a first sheet by a desirable pattern;
   applying a second sheet, which is provided with a notched section in a region to which the optical fiber is drawn, on the first sheet;
   disposing an optical fiber tentatively which expands from the notched section on the second sheet such that a predetermined length of the optical fiber should be drawn out of an end margin of the sheet;
   removing the optical fiber which is tentatively disposed on the second sheet;
   disposing the optical fiber on the second sheet again so as to have a predetermined extra length of optical fiber after disposing the optical fiber; and
   applying the third sheet to the second sheet.

* * * * *

UNITED STATES PATENT AND TRADEMARK OFFICE
CERTIFICATE OF CORRECTION

PATENT NO. : 7,352,921 B2  Page 1 of 1
APPLICATION NO. : 10/473885
DATED : April 1, 2008
INVENTOR(S) : Daigo Saito et al.

It is certified that error appears in the above-identified patent and that said Letters Patent is hereby corrected as shown below:

On the title page item (54) and col. 1, line 1, should read:

Title: ~~MULTILAYER OPTICAL FIBER SHEET, OPTICAL FIBER SHEET FABRICATING METHOD, AND OPTICAL FIBER SHEET~~ <u>MULTI-LAYER OPTICAL FIBER SHEET, METHOD FOR MANUFACTURING OPTICAL FIBER SHEET, OPTICAL FIBER SHEET</u>

On the title page item (75), Third Inventor should read: ~~Tsuyoshi Simomichi~~ <u>Tsuyoshi Shimomichi</u>

Signed and Sealed this

Twenty-first Day of October, 2008

JON W. DUDAS
*Director of the United States Patent and Trademark Office*